United States Patent

[11] 3,584,237

[72] Inventors Raymond A. Stephens
Marion, Iowa;
Don E. Meier, deceased, Late of Marion, Iowa (by Dona M. Meier, widow, heir, and natural guardian of minor heirs)

[21] Appl. No. 760,365
[22] Filed Sept. 17, 1968
[45] Patented June 8, 1971
[73] Assignee Collins Radio Company
Dallas, Tex.

[54] CONVERTER CIRCUIT
3 Claims, 2 Drawing Figs.

[52] U.S. Cl. 307/261, 307/210, 307/232, 307/242, 331/107T
[51] Int. Cl. H03k 17/00
[50] Field of Search 307/261, 232, 254, 210; 331/137 T

[56] References Cited

UNITED STATES PATENTS

| | | | |
|---|---|---|---|
| 2,905,837 | 9/1959 | Barry | 307/232 |
| 3,122,608 | 2/1964 | Taylor | 331/107T |
| 3,328,600 | 6/1967 | Turja et al. | 307/255 |
| 3,041,475 | 6/1962 | Fisher, Jr. | 307/210 |
| 3,210,570 | 10/1965 | Brock et al. | 307/210 |

OTHER REFERENCES

G. E. Tunnel Diode Manual, First Edition G. E. Semiconductor Products Dept. Mar. 1961, TK 7872 D6G4 page 33

*Primary Examiner*—Donald D. Forrer
*Assistant Examiner*—B. P. Davis
*Attorneys*—Henry K. Woodward and Robert J. Crawford

ABSTRACT: A converter having a stable and high current threshold sensitivity including a tunnel diode oscillator operatively connected to receive input data and oscillate in response thereto, transformer means for transforming the oscillations, detector means for producing a DC voltage in response to the transformed oscillations, and gate means controlled by the detector means. The converter is useful, for example, in converting and transforming teletype data to the logic circuitry of a computer.

Figure 1:
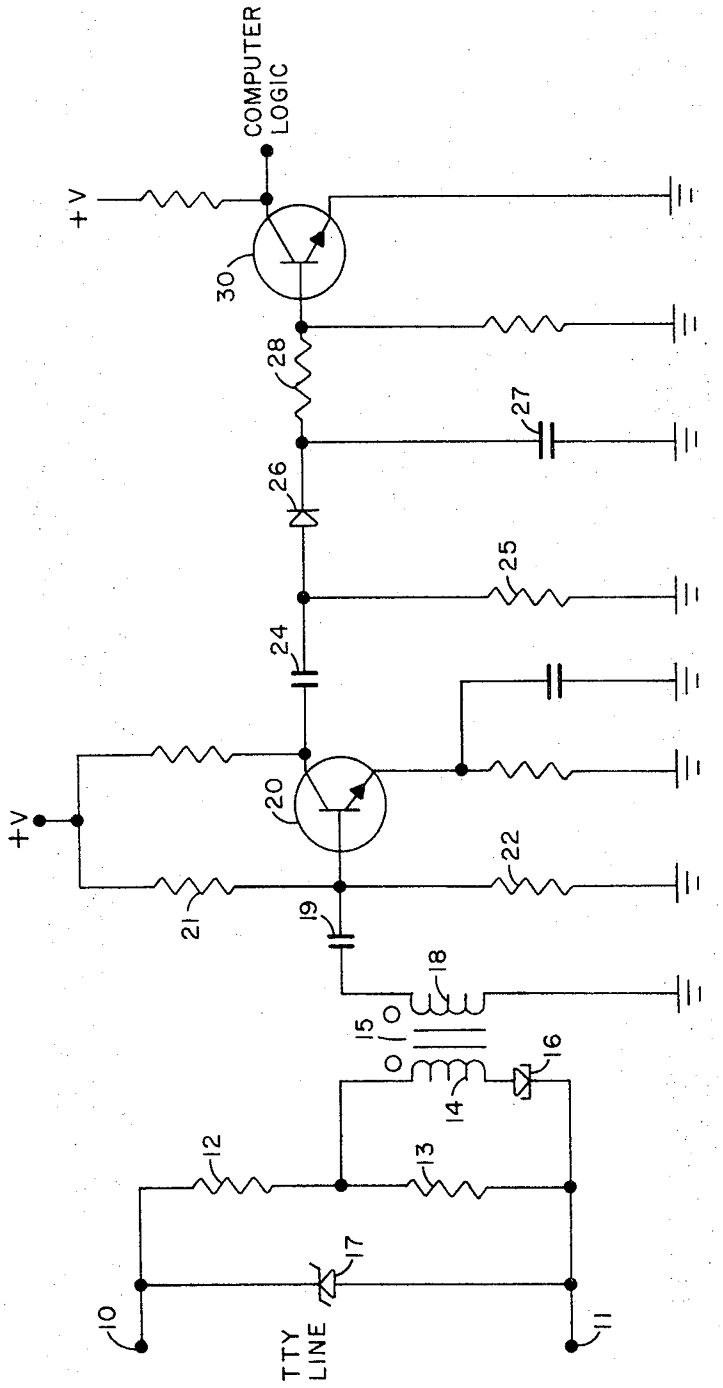

INVENTORS.
RAYMOND A. STEPHENS
DONA M. MEIER
FOR DON E. MEIER, DECEASED
BY HENRY K. WOODWARD
ATTORNEY

INVENTORS.
RAYMOND A. STEPHENS
DONA M. MEIER
FOR DON E. MEIER, DECEASED

BY HENRY K. WOODWARD
ATTORNEY

CONVERTER CIRCUIT

This invention relates to isolation and impedance transformation circuitry, and in particular to such circuitry with the necessary sensitivity, stability, and maintainability for digital applications.

The use of computer means to control such peripheral devices as printing machines and teletypewriter machines, for example, is well known in the art. In such applications an input/output channel is provided to accommodate the communication of data between the peripheral device and computer. Adapters are normally employed to adjust the form of the communicated data for compatability with the receiving device. Not only is format and speed adjustment necessitated, but also impedance transformation is required.

Heretofore, mechanical relays have been used primarily to perform the necessary transformation. However, these relays are relatively large and require frequent maintenance. Several solid state converters have been designed, but so far such converters have met with only limited success.

An object of this invention is a new and improved data converter.

Another object of the invention is a solid state converter which has a stable and high current threshold sensitivity.

Still another object of the invention is a digital data converter which requires little maintenance.

Another object of the invention is a converter especially suited for converting and transforming teletype data to the logic circuitry of a data processor.

These and other objects and features of the invention will be apparent from the following description and appended claims.

Briefly, the converter in accordance with this invention includes a current sensitive threshold detector which is operatively connected to receive an input signal and provide an oscillatory voltage in response to a current above a threshold level. Preferably, the frequency of oscillation is several orders of magnitude higher than the frequency of the input signal. The oscillatory voltage is then transformed and peak detected to provide a bias voltage for gating means to the input of logic circuitry. Advantageously, the present converter can be effectively utilized in either a neutral or polar teletype system.

Figure 2:
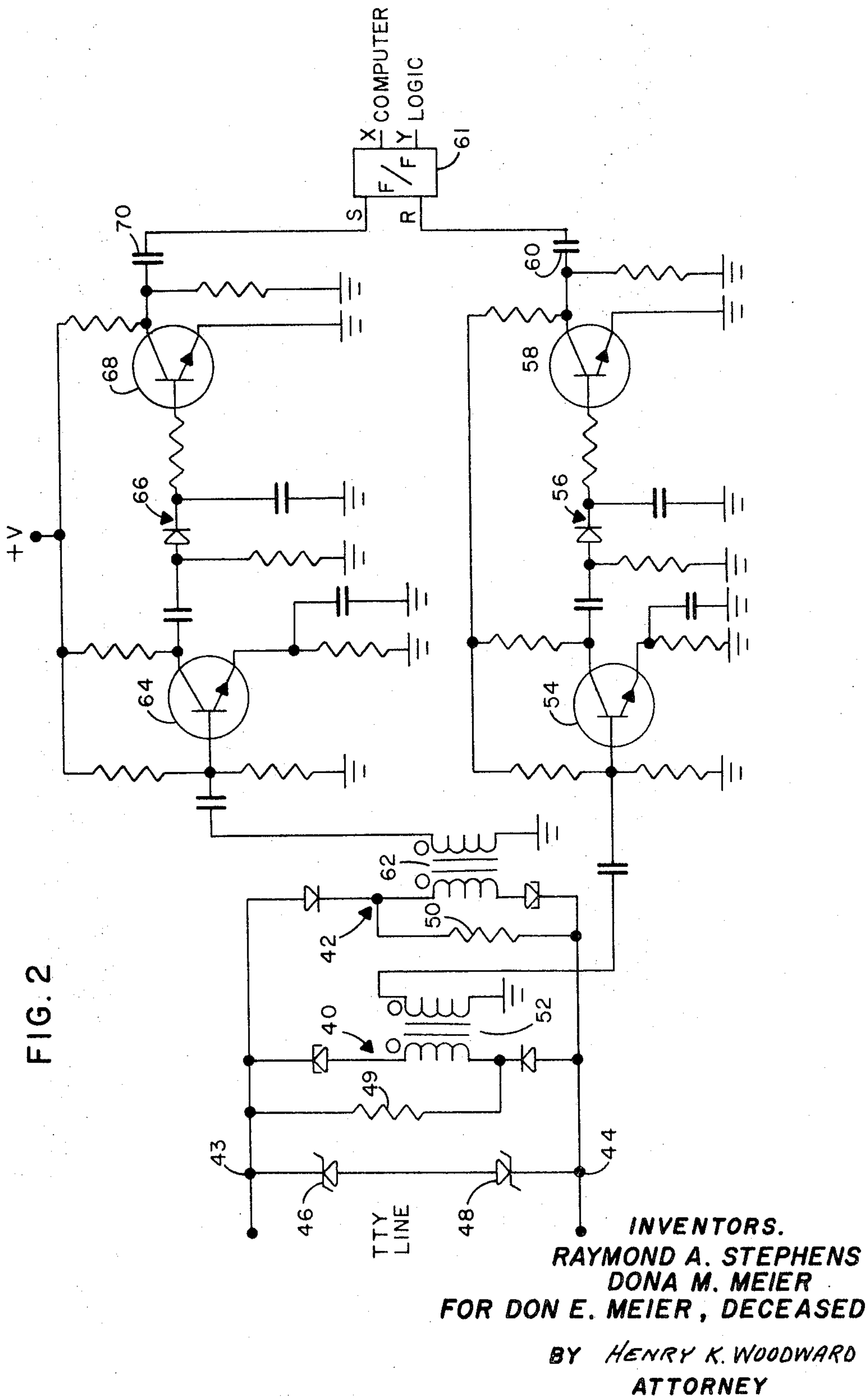

The invention will be better understood from the following detailed description and appended claims when taken with the drawing, in which:

FIG. 1 is a schematic of one embodiment of a converter in accordance with the invention, and FIG. 2 is a schematic of another embodiment of the converter.

Referring now to the drawing, FIG. 1 is a schematic of a converter in accordance with the invention which is advantageously employed for isolation and impedance transformation of data from a teletypewriter to logic circuitry of a computer. In this embodiment the converter operates in a neutral system wherein the input teletype data elements or pulses are indicated by a positive voltage or current level for a "mark" and low voltage for a "space," as contrasted to a polar system wherein positive and negative voltage potentials are utilized, as further discussed below.

In FIG. 1 the electrical signals from a teletype loop are applied to the input terminals 10 and 11 of the converter. Serially connected across the input terminals 10 and 11 are resistors 12 and 13 which function to provide the proper input impedance and threshold current point for a tunnel diode oscillator. The tunnel diode oscillator includes the primary 14 of transformer 15 which is serially connected with tunnel diode 16 across resistor 13. A zener diode 17 is also connected across input terminals 10 and 11 to limit the maximum current applied to the tunnel diode oscillator since excessive current will render the oscillator inoperative. The secondary 18 of transformer 15 is coupled through capacitor 19 to the base of amplifier transistor 20. Resistors 21 and 22 establish a static bias on the base of transistor 20, and the collector of transistor 20 is coupled through capacitor 24 to a peak detector comprising resistor 25, diode 26 and capacitor 27. The cathode of diode 26 is connected through resistor 28 to the base of transistor 30 and controls the conduction of transistor 30. The collector of transistor 30 provides the input to the computer logic.

In operation, when the teletype loop current is below the tunnel diode threshold current, the tunnel diode oscillator does not oscillate and no power is coupled across transformer 15. Transistor 20 is in a static condition and transistor 30 is off. When the loop current exceeds the tunnel diode threshold current, as determined by resistors 12 and 13 and the characteristics of tunnel diode 16, the tunnel diode oscillator immediately starts to oscillate at a frequency determined by the transformer inductance and the tunnel diode parameters. This frequency is preferably at least two orders of magnitude greater than the highest baud rate. The output of the oscillator is coupled by transformer 15 through capacitor 19 and amplified by transistor 20. The amplified output from transistor 20 is peak detected by the detector comprising resistor 25, diode 26 and capacitor 27 and the resulting DC voltage developed across capacitor 27 turns on transistor 30 which in turn controls the input to the computer logic.

The tunnel diode oscillator provides both the sensitive threshold detection required to detect the teletype line current at a predetermined level and also provides the AC signal required for transformer coupling which, in turn, allows DC isolation between the teletype loop and the computer logic.

Referring now to FIG. 2, an alternate embodiment of the converter is shown which is designed particularly for a polar teletype system wherein the teletype code is indicated by positive and negative electrical impulses, i.e., "mark" might be indicated a negative voltage and "space" by a positive voltage. It will be noted that the polar system converter is essentially two neutral system converters as described with respect to FIG. 1 which are operated in parallel to drive a set-reset flip-flop. In the polar system, the converter must sense positive and negative line current at a given threshold level near zero current with the stipulation that if the line current is zero, the converter logic output must remain in its previously signaled state. In the present embodiment this is accomplished by connecting the tunnel diode oscillators shown generally at 40 and 42 across the input terminals 43 and 44 such that tunnel diode oscillator 40 functions when the voltage potential at terminal 44 is positive and tunnel diode oscillator 42 functions when the voltage potential at terminal 43 is positive. Again, zener diodes 46 and 48 are utilized to limit the maximum current through the tunnel diode oscillators, and resistors 49 and 50 are provided to adjust the input impedance and threshold level of the circuit.

Operation of the converter is similar to the operation of the neutral system converter of FIG. 1. The output of oscillator 40 is coupled through transformer 52 to the amplifier comprising transistor 54. The amplified output of transistor 54 is passed through peak detector 56 and turns on transistor 58. When transistor 58 is turned on the changing potential at the collector thereof generates a pulse through capacitor 60 which is applied to the reset terminal of flip-flop 61. Similarly, transformer 62 couples the output of oscillator 42 to the amplifier comprising transistor 64. The amplified output of transistor 64 is passed to peak detector 66 which generates a DC potential that is applied to the base of transistor 68. When transistor 68 is turned on, the change of potential at the collector thereof is passed through capacitor 70 to the set terminal of flip-flop 61.

Thus, in the polar system it is seen that one of the two tunnel diode oscillators, depending upon the polarity of the teletype loop current, will oscillate when the current threshold of the tunnel diode is reached, and the oscillation effects either a set or reset control of the flip-flop 61.

While the invention has been described with reference to specific embodiments, the description is illustrative and not to be construed as limiting the scope of the invention. Various modifications, changes, and applications may occur to those skilled in the art without departing from the spirit and scope of the invention as defined by the appended claims.

What I claim is:

1. A converter circuit comprising:

means for supplying a bipolar direct voltage and including zener diode means for limiting the maximum amplitude of said input signal, a first tunnel diode oscillator means operatively connected to receive said input signal and oscillate in response to an input signal of one polarity above a threshold level, a first transformer means operatively connected with said first oscillator means for transforming the oscillations thereof, a first detector means operatively connected to said first transformer means for producing a direct voltage in response to transformed oscillations, a second tunnel diode oscillator means operatively connected to receive said direct voltage input signal and oscillate in response to an input signal of opposite polarity above a threshold level, a second transformer means operatively connected with said second oscillator means for transforming the oscillations thereof, a second detector means operatively connected to said second transformer means for producing a direct voltage in response to transformed oscillations, and bistable means operatively connected to said first and second detector means whereby said bistable means assumes one stable state in response to a direct voltage from said first detector means and the other stable state in response to a direct voltage from said second detector means.

2. A stable and sensitive means for converting and transforming teletype signals to the input logic circuitry of a data processor or computer comprising a tunnel diode oscillator operatively connected to a teletype loop and oscillate in response to a current above a threshold level, zener diode current limiting means for limiting the maximum current through said tunnel diode oscillator to less than a predetermined value, biasing means for adjusting the threshold current for said tunnel diode oscillator, transformer means operatively connected with said tunnel diode oscillator for transforming the oscillations thereof, detector means operatively connected to said transformer means for producing a direct voltage in response to transformed oscillations, and gate means operatively controlled by said detector means and providing an output for application to logic circuitry.

3. A converter circuit comprising in combination:

amplitude limiting means connected for receiving an input signal to be converted and including zener diode means for preventing the passage therethrough of greater than a predetermined amplitude signal thereby limiting current flow through said amplitude limiting means;

first and second tunnel diode oscillator means including first and second transformer means respectively for transforming the oscillations thereof, and each oscillating in response to first and second input signals of opposite polarities greater than given threshold levels;

means for connecting said amplitude limiting means to each of said first and second oscillator means for supplying input signals thereto to be converted;

first and second detector means operatively connected to said first and second transformer means respectively for producing direct voltages in response to transformed oscillations; and bistable means operatively connected to said first and second detector means whereby said bistable means assumes one stable state in response to a direct voltage from said first detector means and a second stable state in response to a direct voltage to a said second detector means and supplies an output indicative of the respective stable state.